United States Patent [19]

Lazazzero

[11] 4,102,010
[45] Jul. 25, 1978

[54] HANDLE ASSEMBLY FOR A BABY CARRIAGE

[76] Inventor: Esther Lazazzero, 86 Greenlawn Ave., Clifton, N.J. 07013

[21] Appl. No.: 753,454

[22] Filed: Dec. 22, 1976

[51] Int. Cl.² ............................ B25G 1/04; B62B 9/20
[52] U.S. Cl. .................... 16/115; 280/47.37 R
[58] Field of Search ............... 16/115, 111 A, 112; 280/47.37 R, 47.38, 47.34, 47.26

[56] References Cited

U.S. PATENT DOCUMENTS

| 1,215,771 | 2/1917 | Brown | 280/47.37 R |
| 3,017,710 | 1/1962 | Carlson | 280/47.26 |
| 3,726,537 | 4/1973 | McLoughlin | 280/47.26 |
| 3,796,439 | 3/1974 | Perego | 280/47.37 R |
| 3,944,241 | 3/1976 | Epelbaum | 280/47.37 R |

*Primary Examiner*—Louis K. Rimrodt
*Attorney, Agent, or Firm*—Robert D. Farkas

[57] ABSTRACT

An improved handle assembly for a baby carriage includes a pair of handle members, wherein each handle member has an upper and a lower tubularly shaped portion. A lower end of the lower portion is affixed to the frame. The upper portion is formed from upper and lower telescoping sections. A ratchet pivot mechanism joins the lower portion to the lower section of the upper portion. A mechanism is included for locking the two sections together.

1 Claim, 4 Drawing Figures

HANDLE ASSEMBLY FOR A BABY CARRIAGE

BACKGROUND OF THE INVENTION

A number of U.S. patents relate to variously designed baby carriages, but these are non-related to the improved handle assembly of the present invention. These U.S. patents are: U.S. Pat. No. 3,084,949 to Forster et al; U.S. Pat. No. 3,172,628 to Smith; U.S. Pat. No. 3,669,463 to Bowdreau; and U.S. Pat. No. 3,796,439 to Perego.

SUMMARY OF THE INVENTION

My present invention relates to a unique and novel improvement in a handle assembly for a baby carriage.

An object of my present invention is to provide an improved handle assembly for a baby carriage.

A further object of my present invention is to provide a handle assembly which can be extended in length or angled relative to the ground.

A still further object of my present invention is to provide a unique and novel means for locking together two telescoping sections.

Briefly, my present invention comprises a pair of handle members, wherein each handle member has an upper end and a lower tubularly shaped portion. A lower end of the lower portion is affixed to the frame of the carriage. The upper portion is formed from upper and lower telescoping sections. A ratchet pivot mechanism joins the lower portion to the lower section of the upper portion. A mechanism is included for locking the two sections together.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 3:
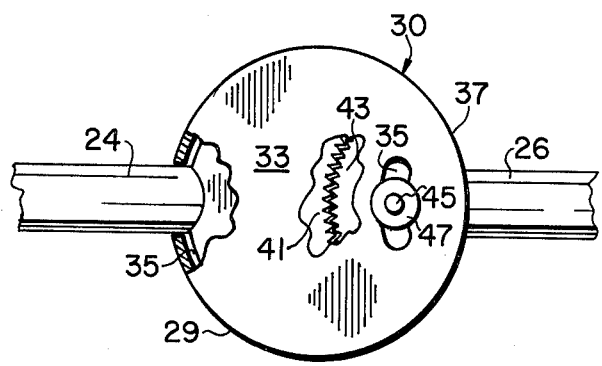
FIG. 3 illustrates an enlarged view of a ratchet pivot means of one of the handle member.
Figure 1:
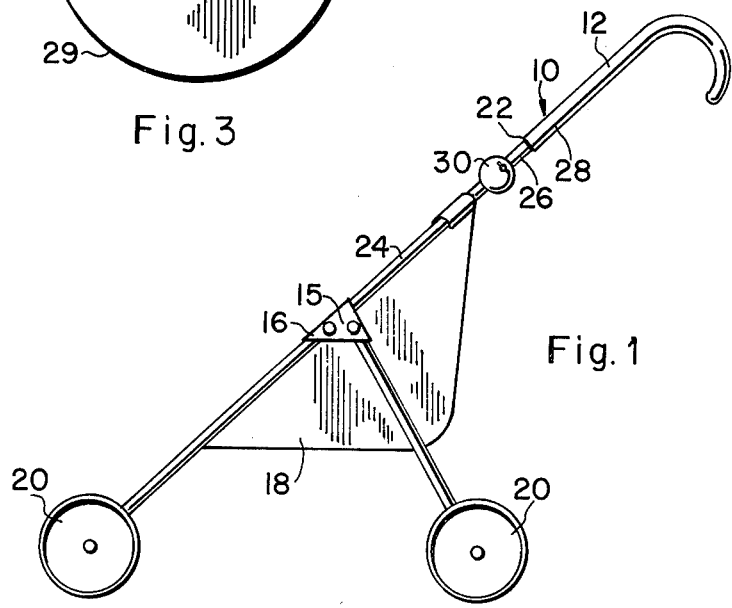
FIG. 1 illustrates a side view of a foldable baby carriage having an improved handle assembly.
Figure 2:
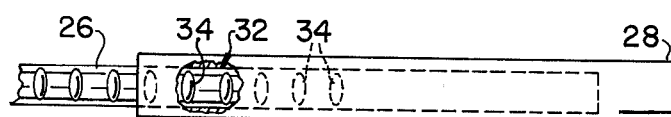
FIG. 2 illustrates a partially broken away view of one of the improved handle members of the carriage.
Figure 4:
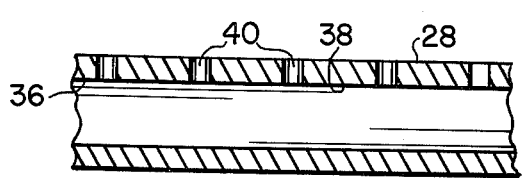
FIG. 4 illustrates a cross section view of an upper section of the telescoping portion of the handle bar member.

Turning now descriptively to the drawings, in which similar reference characters denote similar elements throughout the several views, FIGS. 1 thru 4 show an improved handle assembly 10 formed from a pair of handle members 12, for a folding baby carriage 16 having a frame 15, a seat portion 18, and a plurality of wheel members 20 rotatably disposed on the frame 15. Each improved handle member 12, comprises an upper tubularly shaped portion 22 and a lower tubularly shaped portion 24, wherein the bottom end of the lower tubularly shaped portion 24 is integrally affixed to the frame 15. The upper portion 22 is formed from two hollow telescoping sections 26, 28, wherein the upper section 28 is J-shaped. The lower end of the lower section 26 is pivotally joined to an upper end of the lower portion 24 by a ratchet pivot means 30 thereby permitting the upper 22 portion to be angularly adjusted relative to the stationary lower portion 24. The locking means 32 for the two telescoping sections 26, 28 includes the lower section 26 having a plurality of longitudinally aligned bosses 34 disposed thereon, wherein the bosses 34 are spaced apart. An inner surface 36 of the upper section 28 has an elongated longitudinally aligned channel 38 disposed therein, wherein a plurality of spaced, transverse grooves 40 are disposed in surface 36 and are joined at right angles to channel 38. In use the upper section 28 is turned until the bosses 34 are disposed in channel 38. The upper section 28 is pulled outwardly from the lower section 26 until the desired length has been achieved. The upper section 28 is then twisted as the bosses 34 are locked into the grooves 40.

The ratchet pivot means as shown in FIG. 3 further includes an outer casing 29 having a base, a top 33 with an acruate channel 35 therethrough, and cylindrically shaped sidewall 37 with an acruate shaped opening 39 therethrough wherein the casing 29 is integrally affixed to an upper end of portion 24. A semi circularly shaped concave gear 41 is mounted in casing 29. A semi circularly shaped convex gear 43 is movable disposed in the casing 29 wherein the gears 41, 43 mesh together. The lower end of lower section 26 of lower portion 24 extends through channel 35 and is affixed to gear 43. An externally threaded bolt 45 is affixed to an upper surface of gear 43, wherein bolt 45 extends upwardly through opening 39. A nut means 47 threadably engages on bolt 45 externally to casing 29, wherein nut means 47 frictionally engages top 33 thereby locking gears 41, 43 together.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the U.S. is:

1. An improved handle assembly for a baby carriage having a frame, a seat portion, and a plurality of wheels rotatably joined to said frame, wherein the improvement comprises:

(a) a pair of handle members, each said handle member having upper and lower tubularly shaped portions, a lower end of said lower tubularly shaped portion integrally joined to said frame, said upper portion formed from upper and lower telescoping sections;

(b) a ratchet pivot means joining said lower section of said upper portion to said lower portion for allowing said upper portion to be angled with respect to said lower portion including an outer casing having a base, a top with an acruate channel therethrough, and a cylindrically shaped sidewall with an acruate shaped opening, said outer casing affixed to an upper end of said lower portion, a semi circularly shaped concave multi-toothed gear mounted in said casing, a semi circularly shaped convex multi-toothed gear movably disposed in said outer casing, said convex and said concave gears meshing together, a lower end of said lower section of said upper portion extending through said acruate opening and integrally affixed to said convex gear, an externally threaded bolt affixed perpendicularly to an upper surface of said convex gear and extending upwardly through said acruate channel, a nut means threadably engaging said bolt externally to said casing and frictionally engaging said top of said casing; and (c) means for locking said upper and said lower section of said upper portions together including an inner surface of said hollow upper section having a longitudinally aligned channel disposed therein and a plurality of spaced, transverse grooves disposed therein at right angles to said channel, a plurality of spaced bosses disposed in a longitudinal alignment on an outer surface of said lower section of said upper portion, said lower section slidably disposed in said upper section, said bosses slidably disposed in said channel, said upper section rotatable on said lower section thereby moving said bosses into said transverse grooves.

* * * * *